United States Patent [19]

Nocek et al.

[11] Patent Number: 5,158,791
[45] Date of Patent: Oct. 27, 1992

[54] METHOD OF FORMULATING DAIRY COW RATIONS BASED ON RUMEN-AVAILABLE PROTEIN AND RUMEN-AVAILABLE CARBOHYDRATE

[75] Inventors: James E. Nocek, Lafayette; William M. Seymour, Nelson; Joanne Siciliano-Jones, Homer, all of N.Y.

[73] Assignee: Agway, Inc., Syracuse, N.Y.

[21] Appl. No.: 785,991

[22] Filed: Oct. 31, 1991

[51] Int. Cl.$^5$ ............................................. A23K 1/00
[52] U.S. Cl. .................................... 426/231; 426/623; 426/630; 426/636; 426/807
[58] Field of Search .................. 426/635, 2, 623, 630, 426/807, 231

[56] References Cited

U.S. PATENT DOCUMENTS

| | | | |
|---|---|---|---|
| 4,086,365 | 4/1978 | Snetsinger et al. | 426/807 |
| 4,118,513 | 10/1978 | Braud et al. | 426/807 |
| 4,186,213 | 1/1980 | Burroughs et al. | 426/807 |
| 4,377,596 | 3/1983 | Larsen | 426/807 |
| 4,615,891 | 10/1986 | Nocek et al. | 426/231 |
| 4,957,748 | 9/1990 | Winowiski et al. | 426/807 |

OTHER PUBLICATIONS

"Nutrient Requirements of Dairy Cattle" National Academy of Science, Washington, D.C. 1978 pp. 30–56.

Primary Examiner—R. B. Penland
Attorney, Agent, or Firm—Charles S. McGuire

[57] ABSTRACT

A method of formulating dairy cow rations based on the amounts of ruminally available protein (RAP) and carbohydrates (RAC) in the total daily ration, which includes both grain and forage components. Quantities necessary for determining RAP and RAC values are obtained from conventional chemical analysis and in situ techniques. Statistical analysis of experimentally obtained data showed optimized lactation response is obtained from a total daily ration containing RAP and RAC in the ranges of about 10.5–12.5% and 35.0–45.0%, respectively. Other important nutritional factors such as microbial synthesis and feed escape protein were also shown to be optimized by total daily rations containing RAP and RAC levels within or near the lactation optimization ranges.

4 Claims, 2 Drawing Sheets

SURFACE SCATTER PLOT
MILK (kg)

SURFACE RESPONSE - CONTOUR
MILK (kg) corr_coef = .705

SURFACE RESPONSE – CONTOUR
MILK (kg) corr-coef = .705

METHOD OF FORMULATING DAIRY COW RATIONS BASED ON RUMEN-AVAILABLE PROTEIN AND RUMEN-AVAILABLE CARBOHYDRATE

BACKGROUND OF THE INVENTION

The present invention relates to methods of formulating dairy cow rations, and more specifically to a method of formulating rations based upon content of rumen-available protein and carbohydrate to provide optimized milk production and microbial synthesis.

U.S. Pat. No. 4,615,891, assigned to the assignee of the present inventors, describes a method of formulating dairy cow rations based on the content of non-structural carbohydrates and neutral detergent fiber in the total daily ration. The teachings of this patent have been employed with substantial benefit as reflected in increased milk production. For example, experimental results showed a milk yield on the order of 5.8% higher than in test herds fed previously conventional rations. The method included the steps of analytically determining the non-structural carbohydrate content of grain and forage components of daily rations, and adjusting the proportion and composition of at least one of the components to a level providing a total daily rations having about 30% to 45% non-structural carbohydrates. It is also preferred that the percentage of neutral detergent fiber of the ration components be determined, and that the results of non-structural carbohydrates to neutral detergent fiber be maintained at between about 0.9 and 1.20. The patent further considers the effects of rumen solubility of total protein in the ration, and recommends that the rumen soluble portion constitute between 15% and 25% of the total protein in the total daily ration. While the patent provides useful teachings based on specific recommended amounts or proportions of certain nutrients, it does not consider the effects of such time-related variables as digestion rates and periods of ruminal retention of protein and carbohydrates in the rations.

Microbial growth (in the rumen) is dependent upon simultaneous use of carbohydrates of energy and non-protein nitrogen (ammonia, amino acid and peptides) for protein synthesis. Without adequate energy, microbes will cease to grow and reproduce and ammonia will be lost from the rumen (urine). Likewise, if ammonia and amino acid are limiting, microbial growth will also cease, with a concomitant reduction in fiber digestion. The resultant outcome is not only an alteration in VFA proportion, (acetic-propionic) which significantly influences milk fat percent, but also decreased total energy availability to the cow. Thus, ruminal digestion is a dynamic process which involves nitrogen utilization as well as energy assimilation. Efforts to proportion protein to energy have been properly directed; however rumen availability data has not been adequately considered to these concepts.

The concept of rumen availability is both quantitative and qualitative. If considers those components which are not only solubilized, but also degraded, over time, in the rumen. Major nutrients which should be considered in evaluating rumen availability are protein and carbohydrates. Although rumen available protein does include the measurement of soluble protein, the two are not highly correlated. (Forages: $r^2=0.05$; ingredients: $r^2=0.411$) Rumen available carbohydrate and non-structural carbohydrate (NSC) are highly related to each other for most cereal type ingredients ($r^2=0.70$). However, for ingredient byproducts and forages, they are not well correlated ($R^2=0.028$); this is primarily associated with the rumen degradable fiberous components that are included in the rumen available carbohydrate value and not considered in NSC. For convenience, rumen available protein and rumen available carbohydrate will hereinafter be referred to as RAP and RAC, respectively.

Researchers have developed mathematical models and formulae that incorporate several components of ruminal digestion. This permits development and expression of RAP and RAC values as absolute numbers. However, to applicant's knowledge, specific RAP and RAC values or ranges which optimize milk yield and microbial synthesis have not previously been developed.

The principal object of the present invention is to provide a method of formulating a total daily ration for dairy cows based upon a properly adjusted combination of RAP and RAC to produce a positive response in lactation performance.

Another object is to provide a method of formulating dairy cow rations based upon RAP/RAC levels which maximized microbial protein synthesis and corresponds to increase in non-ammonia nitrogen flow.

Other objects will in part be obvious and in part appear hereinafter.

SUMMARY OF THE INVENTION

The development of the rumen availability concept for both protein and carbohydrate involved a series of tests and studies through which essential data was compiled and interpreted. Feed examples acquired from a variety of sources and locations were chemically analyzed by known procedures to determine their respective RAP and RAC values, as defined hereinafter.

Nutrient (protein and carbohydrate) concentrations of various feedstuffs were obtained by conventional analyses, while nutrient fractions (soluble, insoluble-degradable and undegradable), as well as ruminal digestion and passage rates, were established by the insitu technique. Original samples and specific time point residues were analyzed for: crude protein, starch, neutral detergent fiber, acid detergent fiber (ADF), ADF bound nitrogen (ADF-N), and diaminopimelic acid (DAPA). Nutrient concentrations were fractioned into soluble, insoluble-potentially degradable (further classified as rapidly, or slowly degradable, where applicable), and undegradable. This information was incorporated into a rument availability prediction model which considered the following in each fraction: nutrient concentration in the feed, amount of feed dry matter constituting each fraction, rate of passage and rate of digestion. The resultant values for either RAP or RAC thus consider various aspects of the dynamics of rumen digestion. That is, rather than simply representing a quantity of the nutrient present in a daily ration, the RAP/RAC values take into account the rates of digestion and passage through the rumen, thereby providing a reliable indication of the amount of nutrient available to the rumen bacteria.

Feeding programs based on RAP/RAC levels in the daily ration were developed. Studies were performed under carefully controlled conditions to determine the effect on milk yield and fat content, as well as microbial synthesis, of various RAP/RAC levels. A large-scale field trail was then conducted to confirm operability of the predicted values in actual commercial dairy herds. Factors such as the effect of particular ingredients in the grain mix, days-in-milk of the cows, and cost effectiveness of the feeding program were also considered. The studies showed that a feeding program which maintains the RAP value in the total daily ration within a range of about 10.5-12.5% and the RAC value in the range of about 35.0-45.0% (dry matter basis) will optimize both lactation performance and microbial synthesis in a cost-effective manner.

DETAILED DESCRIPTION

Determination of RAP and RAC Values

Figure 1:
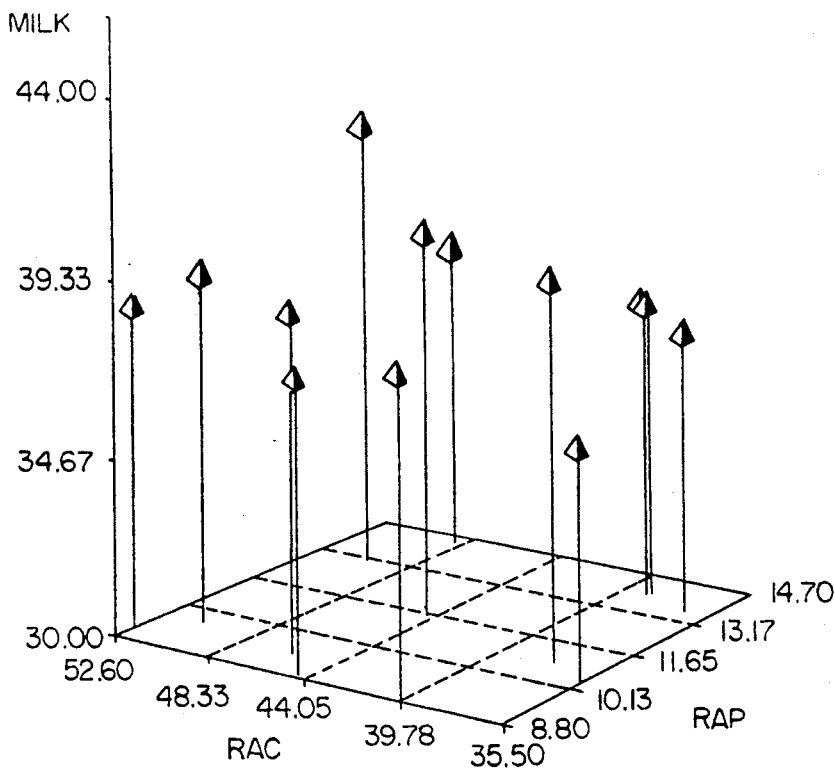
FIG. 1 is a surface scatter plot showing graphically the milk yields obtained from test herds fed grain mixes with various levels of both RAP and RAC.

Values of ruminal availability of protein and of carbohydrate for a variety of feedstuffs were established by calculating the ruminal availability of each of the (1) soluble, (2) insoluble, potentially digestible and (3) indigestible fractions, adding these values together and subtracting from 100. Ruminal availability calculations took into account the fractional nutrient concentration in the feed, the amount of feed dry matter constituting each fraction, and a factor ("disappearance rate constants") taking into account the rates of passage and of digestion for each fraction. The value of ruminal availability (RA) of the nutrients (protein and carbohydrate) of each feedstuff analyzed was established according to the following basic equation:

$$RA = 100 - \left( \sum_{n \text{ and } i=1}^{n \text{ and } i=1} B_i A [Kd_i/(Kd_i + Kp_i)(P_i)] \right)$$

where:
Σ = sum of soluble, insoluble potentially digestible (and fractions therein) and undigestable
$B_i$ = fractional concentration of nutrient in feed,
A = amount of feed DM,
$P_i = e^{-Kp_i L_i}$, where $P_i$ is the proportion of nutrient remaining at initial digestion (t=0), and
$L_i$ = lag time in hours.
$Kd_i$ = rate of digestion for each fraction (%/hr.)
$Kp_i$ = rate of passage for each fraction (%/hr.)

RAP and RAC values were developed for a number of different feedstuffs, including both grains and forages. Equation 1 gas previously been used to express RAP and RAC values and appears, e.g., in J. Dairy Sci., 1:2063 (1988). Values used in the equation were obtained by conventional chemical analysis of feedstuffs and by measurements of actual samples taken from cannulated cows, i.e., by the in-situ technique described later herein.

RAC values are calculated by applying the foregoing equation separately to the fractions and amounts of acid detergent fiber, hemicellulose and starch components of the feedstuff and summing the results. That is, the feedstuff sample is first analyzed to determined the soluble, degradable and non-degradable fractions of each of acid detergent fiber, hemicellulose and starch in the feedstuff sample, as well as the amounts of each fraction present in the feed on a dry matter basis. The formula is then applied to determine separately each of the ruminally available acid detergent fiber, hemicellulose and starch in the sample, and the results added together to provide the RAC value.

The fractional amounts of soluble, degradable and non-degradable protein and three carbohydrate constitutents were determined in quadruplicate by the in-situ method through ruminal cannulation of lactating dairy cows. Groups of porous polyester bags (pore size of 59+2 microns) containing various feed samples were inserted through the plexiglass cannula and submersed in the liquid strata of rumen contents (mid-ventral region of a cow). Grain and by-product type ingredients were ground through a 2 mm mesh screen, and forages were ground through a 5 mm screen prior to placement into the bag. The amount of dry matter included was approximately 5 grams, which yielded a feed-to-bag surface area ratio of approximately 12.6 mg/cm².

Rumen incubation times were 1, 2, 3, 4, 6, 8, 12, 16, 28, 40, 52, 76, 88 and 100 hours. An additional bag containing 5 gms. of cottonseed meal was suspended at each time point with the test bags as a control feed to monitor day to day variation in rumen function. After removal from the rumen, the bags were rinsed immediately with running tap water, and were rinsed a second time (approximately 2 minutes per group to 5 bags) while manipulating the feed sample residue within the bags until the rinse water was clear. The bags were dried in a forced air oven at 55° C. By knowing the amount of dry matter than went into the bag and knowing the dry weight at the end of the incubation period, a percent residual dry matter at each time point could be calculated. After weighing the feed residue at each incubation time, residues were composited and ground through a 1 mm screen in preparation for chemical analysis.

In addition to dry matter, six other chemical analyses were conducted on both the original and composited residues at each time. They were: crude protein, starch, neutral detergent fiber (NDF), acid detergent fiber (ADF), ADF-N, and diaminopimelic acid (DAPA).

Nitrogen analyses were performed and % N was determined according to the macro Kjeldahl method, as described in Official Methods of Analysis, Association of Official Analytical Chemists, Washington, D.C. (12th Ed. 1975). The method of analysis of starch utilized amyloglucosidase to hydrolyze starch into the respective glucose units. Potato starch was utilized as the standard and starch was equal to 0.9×glucose.

Neutral detergent fiber (NDF) and acid detergent fiber (ADF) were measured according to the procedure of USDA Agr. Handbook No. 379 (1970). Amylase was added to the neutral detergent solution to aid in filtering. A nitrogen analysis was conducted on the ADF residue to obtain ADF-N.

Hemicellulose was calculated as a difference between NDF and ADF. DAPA was used as the bacterial marker to correct for nitrogen contamination in both the original and residue samples at each time point. The procedure was that described in J. Sci. Food Agr. 25:45 and Appl. Microbiol. 14:27.

Approximately 250 ml of rumen fluid was collected on the final day of each ruminal incubation series, strained and frozen. Bacteria were harvested from rumen fluid to identify DAPA content in bacteria (1000×g for 10 minutes followed by centrifugation of the supernatant at 1600×g for 30 minutes). Mean bacterial N:DAPA ratio ranged between 30 and 40. The bacterial nitrogen of the residue samples was calculated from DAPA concentration by the ratio of bacterial N:DAPA in isolated rumen bacteria. Residual nitrogen at each digestion time was then corrected for bacterial nitrogen contamination.

Rate Determination by Linear Least Squares Model and Curve Peeling

The procedure using to delineate single, or fast and slow degradation pools has been previously utilized, and will be described in detail. The basic model was a simple, first-order, kinetic equation.

$$R = -Kt + R_O \quad \text{(Equation 2)}$$

where:
- R = natural logarithm (ln) of percent residual for DM, Starch, Crude Protein, ADF, or NDF (Y) (t>O);
- −k = slope, or degradation rate coefficient; t = time (X);
- $R_O$ = residual DM, Starch, Crude Protein, ADF, or NDF at t=O (Y intercept)

Degradation residues were plotted as a semilog function of fermentation time in the rumen. The defined end point of degradation (lowest percent residual beyond which no further degradation occurred) was subtracted from each of the previous time fermentation residues (t>O. end point residual=O), and the resulting values were plotted as before. The resultant degradation curve was appraised for the presence of prominent inflections (i.e., more than one linear component). If no inflection points were observed, single pool and rate were assumed. If two or more distinct linear components were detectable, the fermentation end point to the point of inflection was designated as one linear component. Data for this linear component were evaluated by using Equation (2) with the resultant slope being the slow degradation rate constant ($-k_s$) and the intercept (antiln $R_s$) representing the proportion of nutrient degraded at that rate. The "slow" rate regression equation was used to estimate slow pool degradation residues at times prior to the inflection point, which represent the percent of $-k_s$ material present in the mixed (fast and slow) fermentation residues prior to the point of inflection. Slow rate component residues for time points prior to, but not included in, the inflection point were estimated ($R = -k_s t + R_O$) and subtracted from the remaining residues. The resultant profile again was appraised for the presence of multiple linear components. If more than one linear component still existed, the same procedure as previously described was repeated. If not, appraisal for a discrete lag of degradation was made. If lag was present, those time points were excluded from subsequent rate calculations. A regression analysis was conducted on the remaining logarithmic transformed residues to determine the fast degradation rate constant ($-k_f$). Regression analyses were also conducted on the fast degrading residues to determine intercepts with ($R_{+O}$) and without ($R_f$) the residue of t=O. Using these values, lag time was estimated according to the following equation (see J. Dairy Sci. 63:1437):

$$L = (R_{+O} - R_f)/-k_f \quad \text{(Equation 3)}$$

where:
- L = degradation lag time;
- $R_{+O}$ = intercept (ln) of the equation that included the residue of t=O;
- $R_f$ = intercept (ln) of the equation that did not include the residue of t=) and points up to the observed lag;
- $-k_f$ = rate constant for the regression equation which did not include R at t=O.

The rate constant associated with the regression, not including lag, was designated the fast rate of degradation ($-k_f$), and the intercept at t=lag was the estimated proportion of material degrading at $-k_f$.

The potential extent of degradation of insoluble residue was calculated by subtracting the determined undegraded residue from the insoluble residue at t=O, based on the original residue material at 100%. All degradation data wee corrected to 100% of all nutrients placed in the bags prior to soaking.

Estimates of soluble and 59 micron filterable nitrogen digestion ($Kd_i$) were obtained by multiplying the insoluble nitrogen disappearance rate constant by a ratio determined in a previous study reported in J. Dairy Sci. 66:1663 (1983). This ratio is based on the relative protease digestion of soluble protein compared to the insoluble ruminally degraded rate for the insoluble fraction. Rates of 20%/h for the soluble fraction were utilized for feed ingredients where ratios were not available. For forages, the soluble fraction for protein was delineated into an A1 and A2 fraction. The A1 fraction was assumed to be NPN sources of nitrogen with a digestion rate of 100%/h. This fraction was assumed to be primarily urea and/or ammonia. The true protein fraction of soluble protein was determined by the Lowry method. A rate of 90%/h was assumed in this particular case. The digestion rate for the soluble starch fraction was assumed to be 90%/h.

The soluble fraction was assumed to pass with the liquid phase of rumen contents. A liquid turnover rate of 13%/h was utilized base on previous studies. The insoluble-digestable and undegradable fractions were assumed to have a ruminal passage rate of 5%/h for ingredients and 3%/h for forage type materials, as also indicated by previous studies. The two major ruminal availability components were then calculated from these rates and models.

Microbial Synthesis Study

A study was undertaken to determined the influence of differing levels of RAP and RAC on various ruminal digestive parameters, including carbohydrate digestion, VFA production and nitrogen usage. Twelve experimental diets were prepared using grain mixes having each of four levels of RAP and three levels of RAC. The diets consisted of (on a DM basis) 50% of each grain mix, 25% alfalfa silage and 25% corn silage. The RAP and RAC values were determined by the previously described in-situ method. Sufficient quantities of each diet were blended and pelleted to conduct triplicate, 9 day continuous culture fermentations.

As previously mentioned, it is desirable to maximize microbial synthesis because the rumen microbes are an excellent source of amino acids necessary for enhanced milk production. Non ammonia nitrogen flow is the sum of microbially produced amino acids and those amino acids produced by feed escape protein (i.e., from the ruminally unavailable or undegradable protein). Microbial protein synthesis responded quadratically to increasing RAP level and was maximized at the two highest RAP levels. Microbial protein synthesis and microbial nitrogen as a percent of effluent nitrogen also responded quadratically to increasing RAC levels, the highest rate per day and percentage, respectively, of these quantities occurring with a RAC level of about 32.5%. Non ammonia nitrogen flow decreased linearly with increasing RAP level and was not influenced by RAC level. The study concluded that microbial synthesis and flow, as well as feed escape protein were optimized in early lactation cows be feeding total daily rations containing between 9.7 and 12.3% RAP and a RAC level of about 32.5%.

Controlled Lactation Studies

Application of the foregoing chemical analyses and mathematical procedures to a wide variety of common dairy feedstuffs resulted in development of a large database reflecting, among other things, RAP and RAC values of each of the individual feedstuffs. Studies were conducted under controlled conditions to evaluate the effect of various levels of RAP and RAC, and the interaction of the two, if any, on milk production and composition. In one such trial twenty-seven multiparous cows were blocked by milk production into a Latin square arrangement following the week of peak production. Grain mixes having three different (low, medium, high) RAP and three different RAC levels were formulated, providing a total of 9 formulations. Total mixed rations (TMR) consisting of a 50:50 forage to concentrate ratio (DM basis) were balanced for a 32 kg production level and offered free choice. Alfalfa silage and corn silage (50:50 DM basis) comprised the forage portion of the TMR.

RAP and RAC influenced several production parameters in an interactive manner. Curve fitting techniques indicated that optimal milk production occurred when the grain mix contained between 35 and 45% RAC and 10.5 to 12.5% RAP. Optimals for milk yield were not coincidal with maximum combinations for maximum DMI (10.1-12.1% RAP and 13-52% RAC). Maximal milk fat percentage was associated with lower (<40%) RAC levels, with no apparent maximal for RAP level. At high RAC levels, milk protein percentage increased with increasing RAP level. However, at low RAC levels and mid RAP levels milk protein decreased compared to the extremes. Low RAC and mid RAP levels resulted in higher fat-corrected milk (FCM) yield than other RAP-RAC combinations. Efficiency of dry matter intake used for FCM yield was maximized in the RAP range of 9.1 to 11.7% with RAC levels of less than 38%.

In a second trial one hundred thirty-five cows were assigned to six treatment grain mixes, each fed as 50% of a total mixed ration with a 1:1 mixture of corn silage to alfalfa hay crop silage dry matter. Cows were assigned to treatment on the fourth Tuesday postpartum based on their previous six day average milk production. The grain mixes ranged from 8.6 to 13.7% RAP and 35.5 to 48.3% RAC (dry matter basis). The experiment was designed as a response surface analyzed by regression to determine the optimal level of both RAC and RAP required to maximize each production variable.

Data sets from the two trials were combined for analysis of the effects of dietary RAP and RAC on milk production, milk composition and dry matter intake of high producing cows. The data were analyzed by response surface regression as one data set using the same statistical methods used in analyzing each trial separately.

The data obtained from the trails were condensed into one overall mean value for each treatment within each trail. The first trial consisted of nine treatments and the second of six treatments. Two of the first trial treatments were repeated in the second, but were considered as separate treatments, resulting in a combined total of 15 treatment observations in the data set. The two sets of duplicated treatments produced almost exactly the same mean values for milk and fat-corrected milk. The repeatability of these two treatments was an important factor in the decision to combine the two data sets. An important assumption inherent in the analysis was homogeneous variance across the trials. The pooled standard errors for milk yield on the two trials were 0.61 kg and 0.62 kg, respectively, indicating similar variances.

The combined data set benefited not only from additional numbers of observations but also from a better distribution of treatments across the possible ranges of RAP and RAC. The increased number of observations allowed expansion of the statistical model to include more interaction terms and the lack of fit test. The wider distribution of treatments across RAP and RAC values allows more confidence in the predictive value of the regressions produced by the analysis. Therefore, the most meaningful results were obtained with the addition of more treatment means through the combined analysis, where treatments were most widely distributed.

Figure 2:
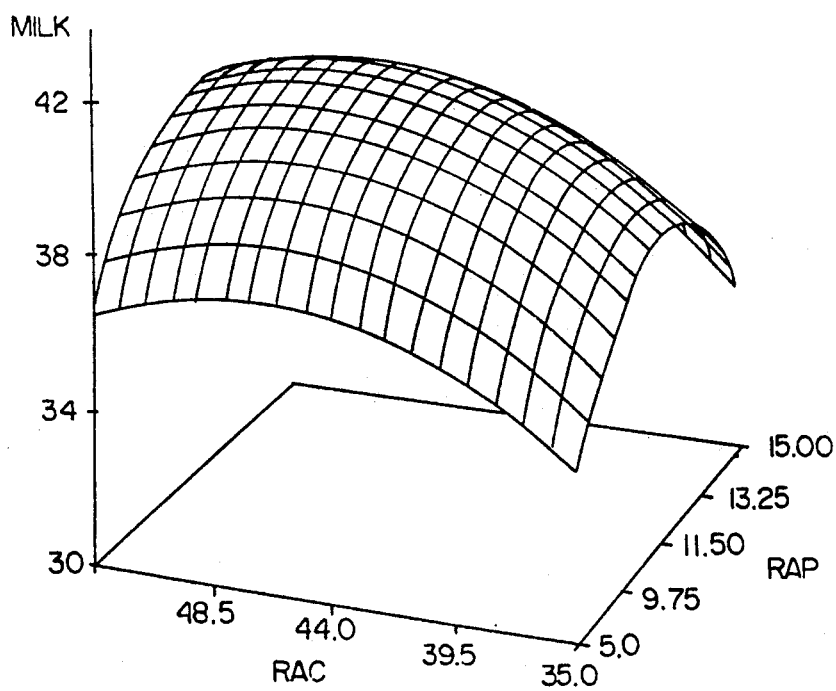
FIG. 2 is a three-dimensional representation showing the response surface regression using the points in FIG. 1.
Figure 3:
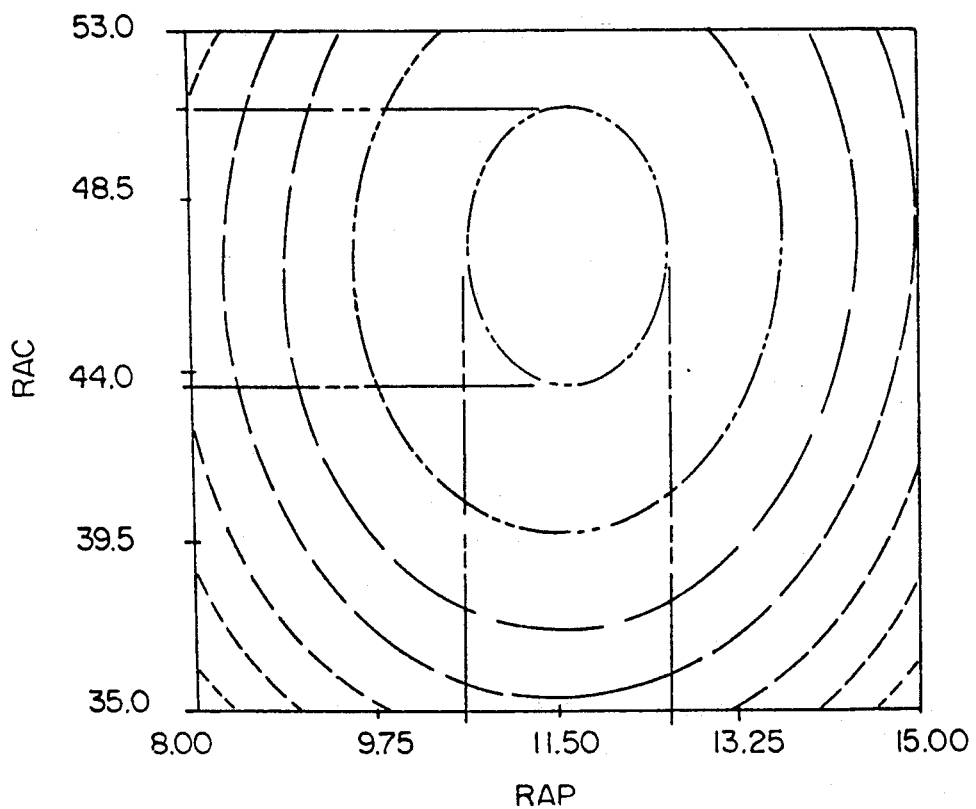
FIG. 3 is a two-dimensional plot of the surface response of milk yields of FIGS. 1 and 2, showing how the recommended optimum ranges of RAP and RAC were developed.

FIG. 1 shows the actual mean values for milk for each treatment used in the analysis. In FIG. 2 the actual response surface regression fitted using the points in FIG. 1 is shown. The surface does not pass directly through all the actual means values shown in FIG. 1, but represents a best fit relationship between milk production, RAP and RAC. In FIG. 3 the contour plot of the milk surface response is shown. Each line corresponds to a given level of milk production. Because the milk response was a maximum, the innermost line (circle) represents the region of highest milk production. It should be noted that the RAC and RAP values indicated on the graphs are those for the grain mix portion of the ration only. The same forages were fed in all ration formulations and the grain portion was varied as necessary to provide the differences in RAP and RAC values in the total ration.

Field Demonstration Trail

After compiling and analyzing results of the two controlled lactation studies in the manner heretofore explained, a demonstration trial was conducted to determine applicability of the RAP/RAC feeding concept to commercial dairy herds. A total of 13 privately owned herds, each previously using manufacturer-recommended feeding programs, balanced for high-yielding diary cows, participated in the trail. In conjunction with testing the RAP/RAC concept, lignosulphonate treated soybean meal (LS-SBM) was included in the concentrate or complete feeds to control RAP within optimal range. LS-SBM is known to have reduced rumen breakdown of protein compared to untreated SBM, and may therefore be considered an ingredient to regulate RAP.

Three monthly DHIA tests of milk yield and composition were used to evaluate responses to the RAP/RAC feeding programs. The first test served as a control value taken prior to any change in the feeding program. The farm then received RAP/RAC test feed as soon after the first test as possible and fed the new feed until after the third DHIA test. This insured that each herd spent at least one full DHI test period on the RAP/RAC feeding program.

Cows greater than 15 days in milk and less than 250 days in milk at the first DHI test date were included in the data analysis. This population was reduced into two subsets, one with cows greater than 40 days and less than 200 days at the first test date and the second with cows between 40 and 125 days in milk at the first test date, for further analysis. Cows greater than 200 days and less than 250 days in milk at the first test date and exhibiting low milk production (>40 lbs were excluded.

The actual milk production at Tests 2 and 3 were compared to the predicted milk production at those dates, given the number of days between Tests 1, 2 and 3 and using the average rate of decline in milk production of 0.22% per day. The 0.22% value represented an average from Northeast DHI persistancy worksheets based on average persistancies of 19,000–20,000 lb rolling herd average herds and the average span of days in milk of cows represented in the trial data.

Forage sample were taken from each farm prior to the trail in order to balance rations for RAP and RAC. RAP of forages was predicted using regression coefficients derived from the RAP/RAC data base developed as previously described. Where possible, the amount of dry matter from forages and grains in each ration remaned unchanged and the grain mix formula adjusted to balance the ration RAP and RAC levels. In some cases the balancing of RAP and RAC required that small changes be made in the feed proportions or the herd owner expressed a desire to feed more or less of a particular forage or home-grown grain. Because all rations were balanced prior to the trial, no major adjustments in crude protein or net energy density were required. In three herds, rations or grain mixes were adjusted during the trail to compensate for a marked change in forage quality.

The thirteen herds consisted of twelve Holstein and one Jersey herd. Rolling herd average (DHI) ranged from 17,221 to 22,258. Average of the herd means was 20,163 lbs of milk for Holstein herds and was 13,921 for the Jersey herd. Herd size, total number of milking age cows, ranged from 40 to 271 cows with an average of 102 cows for Holsteins and was 70 for the Jersey herd. As indicated by the rolling herd averages, the level of management and forage quality was high on the test farms. The rations could, for the most part, be characterized as having been "fine-tuned" prior to the start of the trial using current, manufacturer-recommended feeding programs.

Table 1 shows the milk yield response data for all herds combined using the conservative prediction of 0.22%/day decline in milk production. The cows used in the calculations (n=744) averaged 107 days in milk and 71.9 lbs of milk production at Test day 1, the beginning of the trail. Holstein cows averaged 73.8 lbs of milk per day. The average relative response of these cows was +3.2 lbs of milk per day at Test day 3 when calculated with a 0.22%/day expected decline in milk production. When the population was restricted to cows 40 to 200 days in milk at Test day 1, and therefore finishing at 100 to 260 days in milk, the relative response was +2.9 lbs of milk. This grouping excluded any cows which were likely to increase in milk yield from Test 1 to Test 2. Cows starting the trail from 40 to 125 days in milk averaged +4.1 lbs of milk increase per day.

Table 2 shows the data segregated by herd size, rolling herd average and feed type. The response of the four largest herds was greater than the nine herds with less than 100 cows. The average response of herds below 20,000 lb herd average was comparable to that of herds above 20,000 lbs RHA. The average response of herds feeding concentrate appears to have been greater than that of herds feeding complete feeds.

Overall there was an average increase in feed costs of +$0.01/cow/day, an average increase in milk yield of 3.7 lbs/cow/day, an increase in milk income of $0.42 and a net increase in income-over-feed costs of $0.41 per cow per day. As shown in Table 3 the herds were using a wide variety of grain types prior to the trial. The herds fed corn silage with varying combinations of legume hay crop silage and mixed mostly legume hay. Six herds had a decrease in feed costs and seven had an increase. The overall economic response of the test herds was quite favorable, +$0.41/cow/day, based on average prices in effect at the time of the trial.

Thus, in 13 commercial dairy herds averaging in excess of 20,000 lbs rolling herd average and 71 lbs initial milk yield, a RAP/RAC feeding program improved milk production an average of 3 to 4 lbs per cow per day and income-over-feed costs an average of $0.41 per cow per day. The RAP/RAC feeding program was cost effective at the farm level when compared to current, balanced feeding programs.

TABLE 1

Effect of changing to a feeding program balanced for rumen available protein and carbohydrate (RAP/RAC) on mean milk yield responses in commercial dairy herds.

|  | Factor[a] | DIM[b] | Milk (lbs) Test 1 | Milk (lbs) Test 2 | Predicted Test 2 | Period 1 Relative Response | Milk (lbs) Test 3 | Predicted Test 3 | Period 2 Relative Reponse |
|---|---|---|---|---|---|---|---|---|---|
| Milk yield[c] | .22 | 107 | 71.9 | 69.4 | 66.9 | 2.5 | 65.1 | 61.7 | 3.4 |
| Milk yield[c] 40–200 days in milk at Test 1 | .22 | 110 | 72.0 | 69.0 | 66.8 | 2.2 | 64.8 | 61.7 | 3.1 |
| Milk yield[c] 40–125 days in milk at | .22 | 82 | 76.1 | 73.5 | 70.7 | 2.8 | 69.0 | 64.9 | 4.1 |

TABLE 1-continued

Effect of changing to a feeding program balanced for rumen available protein and carbohydrate (RAP/RAC) on mean milk yield responses in commercial dairy herds.

| Factor[a] | DIM[b] | Milk (lbs) Test 1 | Milk (lbs) Test 2 | Predicted Test 2 | Period 1 Relative Response | Milk (lbs) Test 3 | Predicted Test 3 | Period 2 Relative Reponse |
|---|---|---|---|---|---|---|---|---|
| Test 1 | | | | | | | | |

[a]Calculated using .22% average decline in milk yield per day.
[b]Average days in milk of test cows at Test 1.
[c]744 total cows represented; 571 cows were 40–200 DIM at Test 1 and 361 cows were 40–125 DIM at Test 1.

TABLE 2

Effect of changing to a feeding program balanced for rumen available protein and carbohydrate (RAP/RAC) on mean milk yield of commercial herds segregated by cow numbers; RHA, and feed type

| Herd | # Herds | DIM | Milk Test 1 | Milk Test 2 | Predicted Test 2 | Relative Response | Milk Test 3 | Predicted Test 3 | Relative Response |
|---|---|---|---|---|---|---|---|---|---|
| | | | | | | lbs | | | |
| <100 cows .22 | 9 | 107 | 72.7 | 69.6 | 67.8 | 1.8 | 65.4 | 62.7 | 2.7 |
| >100 cows .22 | 4 | 108 | 70.2 | 68.9 | 64.7 | 4.2 | 64.4 | 59.0 | 5.4 |
| <20,000 lb RHA .22 | 6 | 112 | 65.4 | 63.3 | 60.9 | 2.4 | 59.6 | 56.3 | 3.3 |
| >20,000 lb RHA .22 | 7 | 103 | 77.4 | 74.6 | 72.0 | 2.6 | 71.7 | 68.1 | 3.6 |
| Concentrates .22 | 7 | 103 | 68.2 | 67.9 | 63.4 | 4.5 | 63.6 | 58.4 | 5.2 |
| Complete Feed .22 | 6 | 108 | 76.4 | 72.1 | 70.6 | 1.5 | 68.4 | 66.3 | 2.1 |

TABLE 3

Effect of RAP/RAC feeding program on feed cost, milk income and net income on farmer member herds.

| | Change | | | |
|---|---|---|---|---|
| Herd No. | Feed[1] Cost ($/cow/d) | Milk[2] Yield (lb/cow/d) | Milk[3] Income ($/cow/d) | Net Income ($/cow/d) |
| 1 | −.0224 | 7.6 | .874 | .896 |
| 2 | .063 | .2 | .023 | −.040 |
| 3 | .104 | 1.5 | .173 | .069 |
| 4 | .023 | 1.0 | .115 | .092 |
| 5 | .026 | 1.3 | .150 | .124 |
| 6 | −.029 | 4.9 | .564 | .593 |
| 7 | −.028 | 7.0[4] | .805 | .833 |
| 8 | −.235 | 2.6[4] | .299 | .534 |
| 9 | .018 | 6.7 | .771 | .753 |
| 10 | .016 | 2.8 | .322 | .306 |
| 11 | .213 | 3.4 | .391 | .178 |
| 12 | −.009 | 4.4 | .506 | .515 |
| 13 | −.009 | 4.1 | .472 | .481 |
| Mean | +$.010 | +3.7 | +*.420 | +$.410 |

[1]Change in feed cost was based on a per ton difference of purchased feed, then related back to cost of the total ration intake, assuming a specific DMI for each herd. Extra cost associated with the RAP/RAC feed include personalized mix feed and additional transportation of the Sure-pass product from Land O'Lakes, Minneapolis, MN.
[2]Milk yield was the relative response from test period 1 to test period 3 (Test 1 actual − normal decline of .22%/day through test 3 = predicted milk difference. Test 1 actual − Test 3 actual = actual milk difference. Relative response = actual milk difference − predicted milk difference.
[3]Assume value of 3.5% milk ($.115/lb). Calculation did not consider differential in milk price associated with response in fat test.
[4]Test period 1 data used because Test period 2 data was not suitable.

What is claimed is:

1. The method of formulating dairy cow rations for optimized lactation performance comprising:
   a) determining the rumen available protein (RAP) value of a plurality of feedstuffs based upon the percentages, on a dry matter basis, of ruminally soluble, insoluble but digestible, and undegradable protein present in each of said feedstuffs and the rates of digestion and passage through the rumen of each of said protein percentages;
   b) determining the rumen available carbohydrate (RAC) value of a plurality of feedstuffs based upon the percentages, on a dry matter basis, of ruminally soluble, insoluble but digestible and undegradable carbohydrate present in each of said feedstuffs and the rates of digestion and passage through the rumen of each of said carbohydrate percentages;
   c) said RAC and RAP values being determined according to the formula $$RA = 100 - \left( \sum_{i=1}^{n} B_i A[Kd_i/(Kd_i + Kp_i)(P_i)] \right)$$

where:
$\Sigma$ = sum of soluble, insoluble potentially digestible (and fractions therein), undigestible,
$B_i$ = fractional concentration of nutrient in feed,
$A$ = amount of feed DM,
$Kd_i$ = rate of digestion for each fraction (%/hr.)
$Kp_i$ = rate of passage for each fraction (%/hr.)
$P_i - _e - Kp_i L_i$, where $P_i$ is the proportion of nutrient remaining at initial digestion (t=0), and
$L_i$ = lag time in hours; and
   d) choosing a plurality of said feedstuffs, including at least one grain and at least one forage, to constitute a total daily ration having a (RAP) value in the range of about 10.5–12.5% and a (RAC) value in the range of about 35–45%.

2. The method of claim 1 and further comprising providing a total daily ration consisting essentially of 50% grain and 50% forage.

3. The method of claim 2 wherein said forage component of said total daily ration comprises essentially equal parts of corn silage and alfalfa silage.

4. The method of claim 2 wherein said rumen available carbohydrate value is the sum of the values of rumen available acid detergent fiber, hemicellulose and starch.

* * * * *